US006181049B1

(12) United States Patent
Streckert et al.

(10) Patent No.: US 6,181,049 B1
(45) Date of Patent: Jan. 30, 2001

(54) MULTIPLE CELL THERMIONIC CONVERTER HAVING APERTURED TUBULAR INTERCELL CONNECTORS

(75) Inventors: Holger H. Streckert, Rancho Santa Fe; Daniele Pelessone, San Diego, both of CA (US)

(73) Assignee: General Atomics, San Diego, CA (US)

( * ) Notice: Under 35 U.S.C. 154(b), the term of this patent shall be extended for 0 days.

(21) Appl. No.: 09/249,950

(22) Filed: Feb. 12, 1999

(51) Int. Cl.[7] ..................... H02N 3/00
(52) U.S. Cl. ..................... 310/306
(58) Field of Search ..................... 310/306, 304, 310/301; 376/321

(56) References Cited

U.S. PATENT DOCUMENTS 3,702,408 11/1972 Longsderff et al. .................... 310/4
4,667,126 5/1987 Fitzpatrick .................... 310/306
5,219,516 6/1993 Horner-Richardson et al. .... 376/321

*Primary Examiner*—Karl Tamai
(74) *Attorney, Agent, or Firm*—Fitch, Even, Tabin & Flannery

(57) ABSTRACT

A multiple cell thermionic converter having a generally tubular member of electrically conductive refractory metal with an internal cavity and a coaxial tubular envelope of electrically conductive refractory metal disposed in surrounding relationship thereto. Bodies of electrically insulating ceramic material disposed on elongated sections of facing surfaces of the tubular member and the envelope support juxtaposed emitters and collectors to provide a series of thermionic cells. Tubular metal connectors having particular aperture patterns respectively join the collector of one cell to the emitter of the next adjacent cell to create a series electrical interconnection. The aperture patterns include sets of slots in a pair of parallel planes that are perpendicular to the axis, providing necessary flexibility to accommodate thermal expansion and contraction while providing low electrical resistance and long fatigue life. Axial keyhole apertures and auxiliary slits located in a central plane may also be included.

19 Claims, 4 Drawing Sheets

MULTIPLE CELL THERMIONIC CONVERTER HAVING APERTURED TUBULAR INTERCELL CONNECTORS

The Government has certain rights in this invention pursuant to Contract No. DSWA01-97-C-0088 awarded by the U.S. Department of Defense, Defense Threat Reduction Agency, formerly the Defense Special Weapons Agency.

This invention relates generally to thermionic converters containing a multitude of interconnected cells. More particularly, it relates to multiple cell thermionic converters wherein the cells each include a tubular emitter and a tubular collector which are designed for high temperature operation and which are interconnected in series electrical connection by improved annular metal connectors which electrically connect the collector of one cell to the emitter of the next adjacent cell.

BACKGROUND OF THE INVENTION

It has been well known for a number of years to convert heat to electricity through the use of thermionic converters wherein an electron emitter is heated to a sufficiently high temperature so that it emits electrons into the surrounding space where they are received by a juxtaposed electron collector. The electron collector is maintained at a substantially lower temperature than the emitter, and a very low pressure gas, such as cesium vapor, is present in the uniform annular space or gap between the emitter or collector. To increase the overall voltage, a plurality of such cells are appropriately interconnected, i.e. collector of one cell to emitter of the next adjacent cell; an electrical circuit is then completed by connecting an external load to terminals provided on the exterior of the converter.

An early version of such a multiple cell thermionic converter is shown in U.S. Pat. No. 3,702,408 which illustrates a multiple cell thermionic converter wherein a plurality of diodes are stacked on a central heat pipe in a series-connected network of cells within a chamber that contains cesium vapor. The individual cells are interconnected by flexible leads 53 made of molybdenum which contain spirally-oriented slots that allow the cesium vapor to reach the gaps between each of the juxtaposed emitter-collector pairs.

Although constructions made in accordance with such design may have been satisfactory for emitters operating at a temperature of about 1700 K, the search has continued for improved electrical connectors particularly for use in thermionic converters that will operate at temperatures in the vicinity of 2000 K, wherein the difference in elongation between the collectors and the emitters can place substantial demands upon designers to accommodate stresses that will be inherently created.

SUMMARY OF THE INVENTION

The invention provides a multiple cell thermionic converter wherein there are a plurality of thermionic cells each including a tubular emitter and a coaxial tubular collector that are juxtaposed and separated by a uniform gap and wherein improved annular metallic connectors interconnect the collector of one cell with the emitter of the next adjacent cell. These annular connectors are apertured in a pattern that effectively reduces the stress that is inherently created in such connectors as a result of thermal expansion and contraction which occurs when the thermionic converter changes from ambient temperature to operating temperature and vice versa, while at the same time providing a low resistance path for current between the two electrodes. The aperture pattern includes a set of slot means which are located in two primary planes oriented substantially perpendicular to the central axis of the connector, which is also the central axis of the thermionic converter. Each set includes one or more slots which extend for a total of at least about 180° of arc in the primary plane, and each slot preferably terminates in a circular opening at each end which is of a diameter greater than the width of the slot itself. More preferably, each slot includes two slot segments of substantially equal length in each respective primary plane. Still more preferably, each of the slot segments is provided with a short, axially oriented, keyhole-like opening at about its midpoint, and auxiliary slots of narrower width are provided in a plane midway between the primary planes. Such keyhole-like apertures and/or auxiliary slots have been found to significantly reduce stress in the annular connectors, which are formed from a suitable refractory metal, while not significantly increasing the resistance of the current path through the connector.

DETAILED DESCRIPTION OF THE PREFERRED EMBODIMENTS

Figures 1, 2:
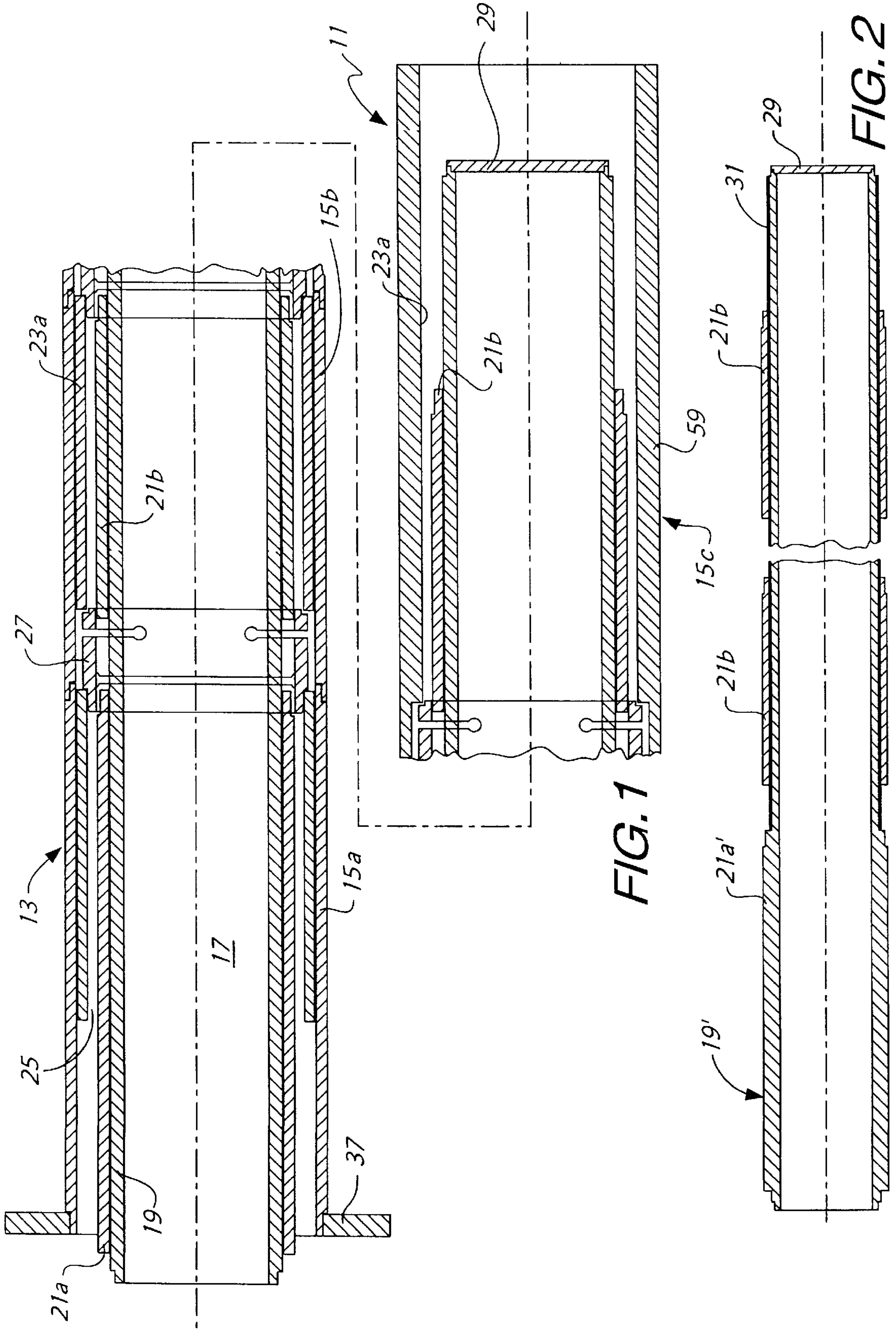
FIG. 1 is a sectional view of a multiple cell thermionic converter employing various features of the invention wherein the plurality of thermionic cells are connected in series arrangement by annular connectors of refractory metal.
FIG. 2 is a sectional view of a central subassembly that might be employed in a thermionic converter as depicted in FIG. 1.

Illustrated in FIG. 1 is an improved thermionic converter 11 wherein a plurality of cells capable of converting thermal energy to electricity are arranged within an outer containment vessel or envelope 13 wherein a high vacuum condition is established with only a minute atmosphere that preferably contains a small amount of cesium vapor. The outer vessel 13 is formed from a plurality of sections, i.e.

sections 15*a*, 15*b* and 15*c*, that are welded together or otherwise suitably joined. Disposed coaxially within the containment vessel 13 is an interior tubular support member 19, which is formed with an internal cavity 17 and on the outer cylindrical surface of which a plurality of spaced-apart electron emitters 21*a* and 21*b* are supported. A plurality of spaced-apart electron collectors 23*a* and 23*b* are located on the interior surface of the containment vessel 13. The emitters and collectors, which are often referred to as electrodes, are juxtaposed and coaxial, being separated by short annular gaps 25 in which the cesium atmosphere will be present. The collector of the cell at the left end is connected by a tubular connector 27 to the emitter of the next adjacent cell, and this arrangement is repeated between each pair of adjacent cells to create a series electrical interconnection of all of the cells in the thermionic converter. For example, if there are ten cells, there will be nine electrical connectors 27.

The illustrated arrangement is one in which heat will be supplied to the interior surface, as for example by fission of nuclear material filling the cavity 17 within the interior tubular support, for example, as a part of an overall nuclear reactor arrangement. Under such circumstances, heat is appropriately removed from the outer containment vessel 13 in order to maintain the collectors 23 at a temperature of, for example, about 700 K to about 1200 K below the temperature of the emitters 21. It should be understood, however, that the relationship could be reversed in order to provide an arrangement wherein heat is supplied to the surface of the outer containment vessel and removed from the interior tubular support. An arrangement of this sort might be employed in a spacecraft where the concentrated rays of the sun are used to heat the outer containment envelope and wherein the interior tubular support is connected to a heat sink that extends exterior of the spacecraft so as to radiate heat and maintain the desired temperature differential between the electrodes.

FIG. 1 illustrates a thermionic converter 11 which may incorporate, for example, ten thermionic cells interconnected in series electrical connection so that the voltages of the individual cells are additive. The preferred method of construction is by first creating the interior subassembly of the type shown in FIG. 2 that includes a tubular support 19' which carries ten emitter electrodes on the exterior surface thereof. The subassembly illustrated in FIG. 2 is essentially the same as that which forms a part of the thermionic converter 11 of FIG. 1 with a minor difference that is indicated by the use of prime numbers. In the FIG. 2 alternative embodiment, the left end of the support tube 19' is formed with an integral section of greater diameter that constitutes the emitter 21*a*', whereas the subassembly employed in FIGS. 1, 5 and 6 uses a separate refractory metal sleeve 21*a* for the emitter that is suitably affixed, as by welding or brazing, to a refractory metal tube of constant interior and exterior diameter.

So long as the gap between the emitters and the collectors is constant, the shape of the electrodes is not overly important from a functional standpoint, but it is of course of concern from a manufacturing standpoint. The illustrated embodiments utilize both an inner tubular support and an outer containment vessel which are circular in cross-section for ease in manufacturing, and such is preferred. However, it should be understood that any desired complementary cross-sections might be used, for example elliptical or polygonal, i.e. square, hexagonal, octagonal, etc. The tubular electrical connectors 27 will have the same cross-sectional configuration as the respective supports upon which the electrodes are respectively carried.

For efficient operation, it is preferred that the emitters be heated to a temperature of at least about 1700 K and preferably between about 1900 and 2200 K; moreover, a temperature differential of at least about 700 K, and preferably between about 900 K and 1200 K, is maintained between the electron emitters and the electron collectors. Accordingly, the materials used in the construction of such a thermionic converter 11 must be capable of operation for extended periods of time at such temperatures, and the materials for construction are chosen accordingly. Refractory metals or other high temperature materials are used for the containment vessel 13, the inner tubular support 19, the electron emitters 21 and the electron collectors 23. Examples of these materials are well known in this art and include tungsten, molybdenum, niobium, rhenium, tantalum and other rare earth metals, as well as alloys thereof such as TGM (99% Mo, 0.4% Ti, 0.07% Zr and 0.05% C) and TCZ; however, tungsten, niobium and molybdenum are generally preferred. For the emitters, there may be instances where it will be desirable to employ composite materials; for example, a tungsten substrate which has been coated by electron beam deposition or the like with an overlayer of rhenium.

As can be seen from the subassembly shown in FIG. 2, the tubular internal support 19' has an essentially constant diameter interior surface which defines the cavity 17, and the right end is closed by a plug 29 of similar material to the tube itself. The exterior surface of the support has a larger diameter section at the left end that forms the emitter 21*a*' and an elongated constant diameter section, to which a thermally conducting, electrically insulating ceramic body 31 is applied by plasma-spraying with a plurality of layers. In a representative construction, there may be nine individual, uniformly spaced-apart emitters 21*b* that are carried on the exterior surface of this elongated ceramic body 31.

Because these converters 11 will be subject to substantial excursions in temperature, it is important that such be given consideration in the design so that there is compensation for the elongation and contraction effects of these changes in temperature; otherwise, stresses may be set up that would ultimately result in degradation of the construction. There are inherent differences in coefficients of thermal expansion (CTE) between a refractory metal and most electrically insulating ceramic oxide materials; however, it has been found that, by plasma-spraying a refractory metal surface with a plurality of layers comprising mixtures of finely particulate refractory metal and refractory metal oxide, a strong and stable graded intermediate ceramic body can be provided. The outermost zones of such a thin ceramic body, that will be in contact with a refractory metal surface, are created using a mixture of particulate refractory metal and refractory metal oxide that includes at least about 80 weight % of the refractory metal and preferably at least about 90 weight % thereof. Preferably, the CTE of the outermost layer will be within about 10% of the refractory metal with which it is in contact.

Because the general intention is to reasonably closely match the ceramic mixture to the refractory metal, the particulate refractory metal used is preferably the same as the refractory metal with which it will be in contact, or one that is closely similar in CTE and other physical and chemical characteristics. If the emitter is made of a layered composite, the refractory metal of the outer surface is preferably used as the particulate in the ceramic layer. Generally, the particulate refractory metal is supplied to the plasma spray device in the form of particles having a size not greater than about 10 μm, and the refractory metal oxide is supplied in the form of particles having an average size between about 0.2 and about 0.4 μm.

The refractory metal oxide should be chemically compatible with the refractory metal support member and be stable at the temperatures at which it will operate. Although a refractory metal oxide will not have a thermal conductivity approaching that of the refractory metal, those having relatively high thermal conductivities and CTEs are preferred. For support members formed of tungsten, molybdenum, rhenium and niobium, the preferred refractory oxides for use in making the ceramic body are scandia, hafnia, zirconia and alumina; however, other refractory metal oxides, including thoria, lanthania, gadolinia, europia and beryllia, may alternatively be employed. Alumina may be used in association with the collectors where the temperature is lower, but it usually would not be used with the emitters if cesium is to be included in the atmosphere.

As above indicated, the outer zone should have a major percentage of particulate refractory metal (preferably the same refractory metal as that of the support member) so that it will have strong adherence to the surface upon which it is plasma-sprayed, and this outer zone may have a thickness of about 100 μm. Although a thick single outer layer could be used for this zone, upon which a layer of pure refractory oxide will then be deposited, it is found that superior results are achieved when a gradation of the content of particulate refractory metal in the mixture with, for example, scandia is used. For example, a plurality of layers may be plasma-sprayed onto the surface, each about 50 μm in thickness and each having about 10 to 20% less particulate refractory metal and 10 to 20% more scandia until a central zone of substantially pure scandia is reached. Because it is this central zone that provides the major electrical insulating properties, this central zone is preferably at least about 500 μm thick. Once this substantially pure scandia central zone has been deposited, the plasma-spraying process is reversed, thereafter applying layers with gradually increasing amounts of refractory metal.

The particulate refractory metal that is employed in this other outer zone which flanks the central, substantially pure scandia zone is preferably the same as the refractory metal that forms the emitter or collector that will be supported thereon. More preferably, because of the major temperature excursions to which the thermionic converter will likely be subjected in moving from ambient temperature, which in outer space will be a relatively low figure, to its operating temperature, it is preferred that each tubular support and the emitters or collectors that will be supported thereupon are made of the same refractory metal or at least of refractory metals having closely similar CTEs.

Plasma-spraying allows the thickness of each of these ceramic layers to be closely controlled and also accomplishes excellent adherence to the metal support and between adjacent layers; however, the density of the plasma-sprayed material may be only about 70%. Generally, it is desired that the thickness of the overall ceramic body that is plasma-sprayed onto either the interior surface or the exterior surface of the respective refractory metal support tube should be between about 0.8 mm and 1.2 mm for the emitter, with a preferred target value for such a ceramic layer being about 1 mm, in a thermionic conversion device in which the outer diameter of the containment vessel is about 3 cm. For the collector, the ceramic layer should total between about 0.4 mm and 0.6 mm, with a target value of about 0.5 mm.

Once such a thermally conductive electrically insulating ceramic body 31 has been deposited upon the surface of the major elongated section of the refractory metal support tube 19, the next step is to affix the emitters or collectors thereto. For example, tungsten or rhenium-coated tungsten may be used for the emitters, and niobium may be used for the collectors. Although the emitters or collectors may be individually formed and then individually thermally bonded to the outer zone of the ceramic body 31, it has been found that it is particularly economical and efficient to initially thermally bond a thin tube having a thickness of between about 0.5 and about 2 mm and a length sufficient to provide the desired number of emitters or collectors in the multi-cell converter. For example, if the intention is to have ten cells in series in the illustrated converter 11, then the length of the tube might be of sufficient length to provide emitters for nine cells, as the emitter 21*a* for the left end cell is provided by the enlarged diameter section of the support member 19.

It has been found that hot isostatic pressing is an excellent procedure for affixing individual emitters or collectors, or an elongated thin tube, to an intermediate ceramic body, and it also fully densifies the plasma-sprayed ceramic layers. Generally, the plasma-sprayed layers of refractory metal oxide, or of a mixture of particulate refractory metal and refractory metal oxide, have a density of about 70% of maximum theoretical density, and the thermionic converter functions in a superior fashion when the ceramic body is essentially fully dense. The use of high temperature and pressure which is provided by hot isostatic pressing has been found to not only create the desired strong thermal bonding, but also to simultaneously effect the densification of the flame-sprayed ceramic layers. For example, a thin tube of tungsten, molybdenum or niobium, about 1 mm in thickness, can be effectively thermally bonded to an adjacent ceramic surface by hot isostatic pressing for about 1 hour at about 1700° C. At the same time, a ceramic body having the target thickness of about 1 mm is reduced to 0.7 mm, while a body about 0.5 mm thick is reduced to about 0.3 mm. Once such a thin tube has been thermally bonded to the intermediate ceramic body 31 on the support tube 19, a grinding or other suitable machining procedure is used to mechanically remove eight annular bands at equal intervals along the length of the tube, thus creating nine individual electrodes which serve as the illustrated emitters 21*b*.

Figure 4:
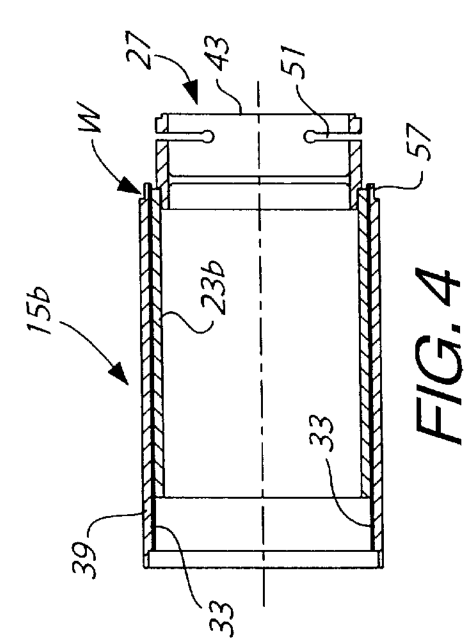
FIGS. 3 and 4 are cross-sectional views of individual subassemblies that are employed in making the thermionic converter of FIG. 1.
Figure 3:
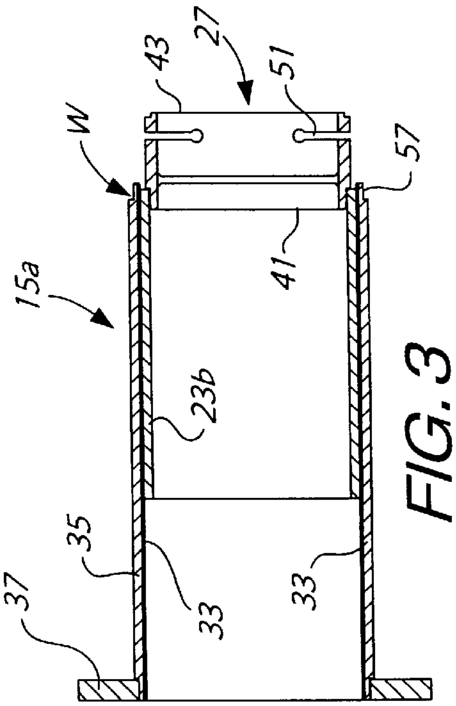
Figure 5:
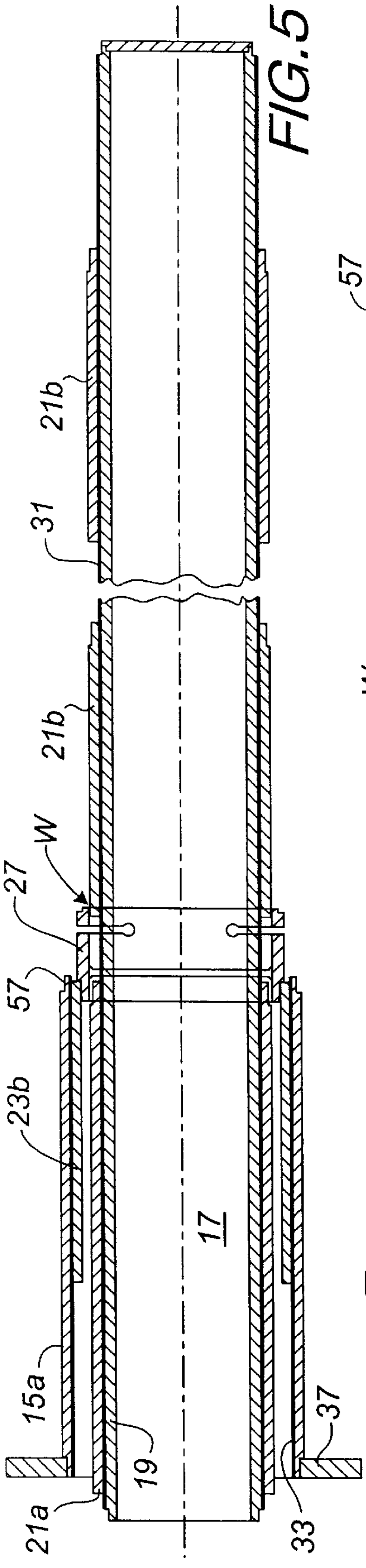
FIG. 5 is a sectional view of the thermionic converter of FIG. 1 at a stage during its fabrication when a left end section of the segmental exterior envelope, which includes an electrical connector, is positioned about the inner subassembly as the connector is being joined to the electrode of the next adjacent cell.
Figure 6:
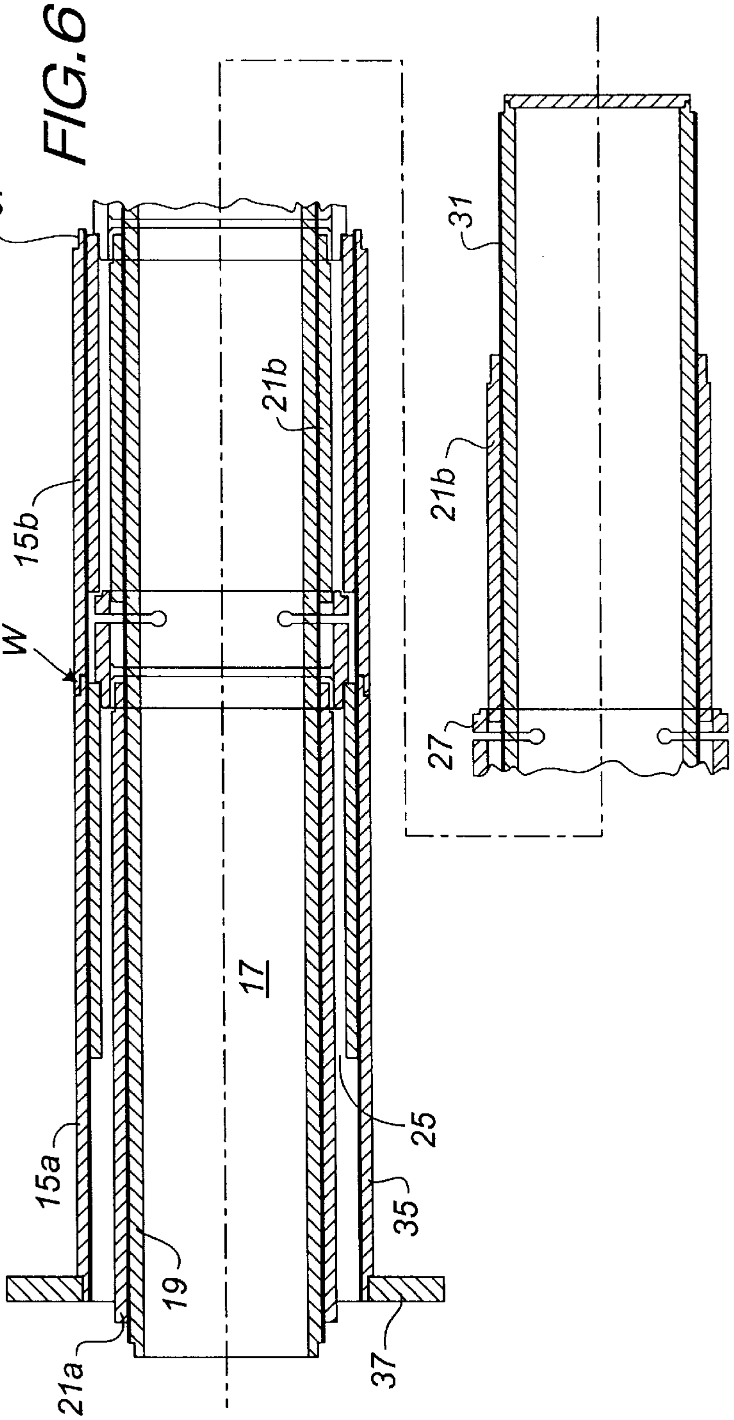
FIG. 6 is a sectional view similar to FIG. 5 of the subassembly which now includes a second segment of the outer envelope of the type shown in FIG. 4 located in place.

As earlier indicated, the thermionic converter 11 shown in FIG. 1 has an outer envelope that is constructed by mating thin separate segments 15 which are independently connected to a prefabricated subassembly such as that illustrated in FIG. 2, and illustrated in FIGS. 3 and 4 are envelope segments 15*a* and 15*b*. Individual collectors 23*a* are plasma-sprayed to create surrounding ceramic bodies 33; then hot isostatic pressing (HIP) is used to create a thermal bond between the ceramic-coated electrode and the interior surfaces of tube segments 15. HIP simultaneously densifies the plasma-sprayed ceramic body 33 while achieving the thermal bond between the adjacent surfaces. In a construction of a converter where there are ten thermionic cells, one segment 15*a* would first be installed at the left end, as shown in FIG. 5. It would be followed by the addition of eight segments 15*b*, as shown in FIG. 6, and concluded by the addition of one segment 15*c* at the right end, to achieve the configuration seen in FIG. 1.

As best seen in FIG. 3, the segment 15*a* may be formed from a niobium tube 35 about 1 mm in thickness and about 70 mm in length, and an annular flange 37 of niobium is welded at the left end of the tube 35. A niobium collector about 1 mm thick and having the same length as the tube 35 is plasma-sprayed with a plurality of layers to create a ceramic body 33, as described hereinbefore, having a thickness between about 0.4 and 0.6 mm. For the ceramic body 33, the first layers deposited employ about 90% particulate niobium and about 10% alumina and are graded to reach the central zone of pure alumina; to be compatible with the niobium outer tube, the later-deposited zone of the ceramic body is also made using mixtures of alumina and particulate niobium. This ceramic-coated thin tube of niobium about 1 mm thick and about 70 mm in length is thermally bonded to the interior surface of the niobium tube 35 by hot isostatic pressing at about 1700° C. for about 1 hour. Thereafter, a portion of the interior niobium tube is mechanically or otherwise removed, beginning at the left end, so that a collector 23*b* about 42 mm long remains at the right end of the segment 15*a*, the entire interior surface of which is covered by the ceramic body 33. The segments 15*b* are similarly constructed with the exception that shorter niobium tubes are used that are only about 50 mm in length. The exterior surface of each niobium tube is plasma-coated with a similar ceramic body 33, followed by thermal bonding using hot isostatic pressing. Following HIP, sufficient of the left end of the interior niobium tube is removed so that a collector 23*b* about 42 mm long remains extending to the right end. In addition, annular recesses are machined in the exterior surfaces of the tube segments 15*a* and 15*b* and the interior surface of the collectors 23*b* at the right end and also in the interior surface of the tube segments 15*b* at the left end for reasons to be explained hereinafter.

Figure 8:
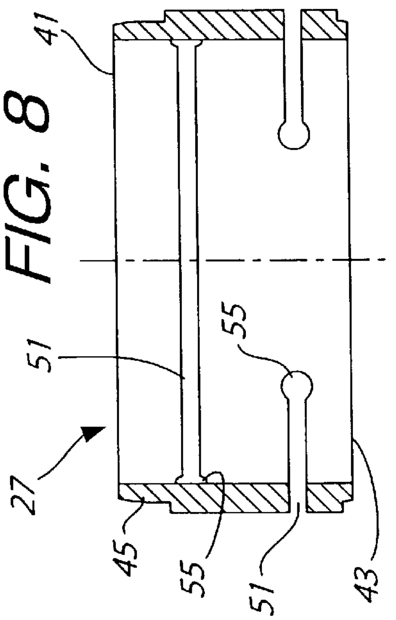
FIGS. 7 and 8 are front and side sectional views, enlarged in size, of one of the connectors illustrated in FIGS. 1, 5 and 6.
Figure 7:
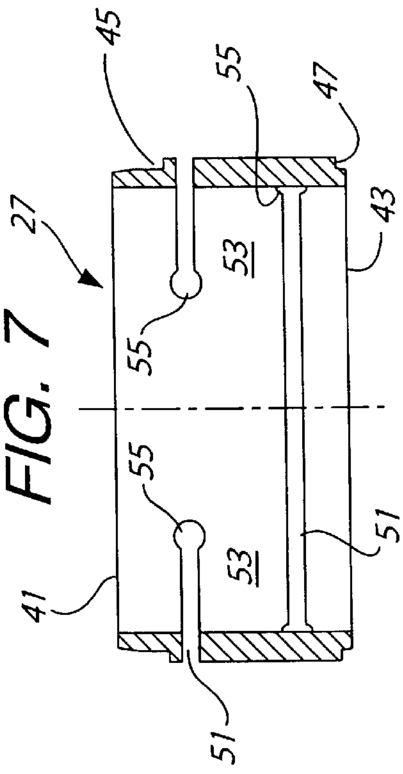

In the preferred construction, the electrical connectors 27 are affixed to the individual segments 15*a* and 15*b* before the segments are assembled to create the outer containment envelope, as can be seen in FIGS. 3 and 4. The tubular electrical connectors 27 are best seen in FIGS. 7 and 8 where they are enlarged in size to show the details. Each connector 27 is a short section of a tube of an electrically conductive metal which remains stable for extended periods at high temperatures in a high vacuum environment; generally refractory metals are preferred. Of these, the more preferred refractory metals are tantalum, niobium, tungsten and molybdenum, and the preferred construction utilizes short tubular sections of tantalum having a thickness between about 1.2 and about 1.6 mm and a length of about 11 mm, as described hereinafter.

As previously indicated, for the thermionic converter 11 to operate efficiently, there should be a large temperature differential between the emitters and the collectors. Thus, a thermal expansion mismatch develops when a thermionic converter is heated from ambient conditions to operating conditions because of the greater amount of expansion that the emitters will experience, and the intercell connector 27 needs to be sufficiently flexible to accommodate such a CTE mismatch. It has been found that the key to effectively accommodating such CTE mismatches, while retaining a good path of electrical conductivity and a mechanically stable overall arrangement, is to provide the tubular electrical connectors with an aperture pattern that includes a set of slots, including slots of substantial width located in at least two primary planes which are substantially perpendicular to the axis of the tubular connector; such an arrangement permits controlled contraction in axial length without creation of torque while still providing a current flow path of low electrical resistance. Preferably, the aperture pattern is symmetrical so that there is no resultant torque created during such a temperature excursion. For purposes of this application, by symmetrical is meant that the connector can be divided in half by at least one plane of symmetry to create two halves which both have an aperture pattern that is essentially the same.

In the embodiment illustrated in FIGS. 7 and 8, the electrical connectors 27 are short tubes having a length not greater than about one-half of the interior diameter and having an upper edge 41 and a lower edge 43 that lie in parallel planes. An elongated recess 45 is cut in the exterior surface at the upper edge 41, and a short annular relief 47 is cut in the exterior surface at the lower edge, for purposes to be explained hereinafter. For example, the outer diameter of the connector may be about 25.6 mm, and the wall thickness may be about 1.45 mm, with the elongated recess 45 having a radial depth of about 0.6 mm and the opposite short relief 47 having a radial depth of about 0.5 mm. Slots are provided in two primary parallel planes and are positioned so as to leave lands 53 therebetween which are referred to as beams or ligaments and which provide the needed flexibility and a path of good electrical conductivity.

In the illustrated embodiment, the two primary planes, in which the slots 51 are located, are each nearer the respective edge of the electrical connector 27 than to each other, an arrangement which is preferred for some but not necessarily all applications. Each primary plane preferably includes slots 51 of equal length. When two slots 51 are used in each primary plane, the slots are preferably each between about 90 and 120° in arc length, and more preferably between about 100 and 110° in arc length. However, it should be understood that a larger number of slots, e.g. three or four slots, or one slot could be used in each plane. If only a single slot is used, it may have between about 250 and about 290° of arc length, and preferably between about 260 and about 280° of arc length. If, for example, three slots were used in each primary plane, they might be between about 60 and 90° of arc length each. Generally, the total length of the slot or slots in each primary plane should be at least about 180° of arc length to provide the needed flexibility.

The width of the slots is also important, and each slot should have a width between about 2% and about 20% of the axial length of the tubular connector; preferably, the slots 51 in the primary planes have a width between about 4 and about 8% of the axial length of the tubular electrical connector. The thickness of the electrical connector 27 may be between about 1% and about 20% of the outer diameter of the connector, but it will generally have a thickness between about 2 and 12% of the outer diameter and more preferably between about 4 and about 8% of the outer diameter.

Such a slotted construction was found to create the needed flexibility; however, it does result in the creation of some concentration of stress at the ends of each slot. It has now been found that such stress is relieved by removing additional material at these points by drilling or otherwise forming holes 55 of a diameter greater than the thickness of the slots 51 at each end. The diameter of these holes 55 is preferably between about 50 and about 80% greater than the width of the slots 51. These holes 55 are usually radially oriented; however, for manufacturing convenience, pairs of holes symmetrically positioned in opposite halves may be machined to have the same axis. As an example, the connector 27 illustrated in FIGS. 7 and 8 may have a length of about 11 mm, an outer diameter of about 25.6 mm, and a wall thickness of about 1.45 mm; it might have two slots of about 110° of arc each in each primary plane (measured between the centers of the holes 55 at each end) with the respective ends each being spaced apart by about 70° of arc. The orientation of this pattern of two slots 51 in one primary plane would be offset by 90° for the two slots in the other primary plane so as to create relatively short ligaments 53 in the central region between the two slots which still provide good paths for current flow between the upper and lower edges 41,43 through the regions of the respective 70° of arc between the adjacent ends of the slots in each plane. For example, in FIG. 7, current from the edge 41 can flow downward between the holes 55 and then both right and left along the ligaments 53. The slots 51 may have a width of about 0.7 mm, and the holes 55 at the end of each slot preferably have a diameter of about 1.2 mm. It has been found that the symmetry of the aperture pattern and the orientation of the slots 51 in planes that are perpendicular to the axis of the tubular connector provide good flexibility to accommodate differential thermal expansion during temperature excursions at acceptable stress concentrations without resulting in undesirable torque, while also providing a relatively low resistance path for current flow from edge to edge of the connector.

The elongated recess 45 at the upper edge 41 of the connector 27 facilitates joinder to the collector 23*b* of an outer segment of the envelope to create the subassemblies shown in FIGS. 3 and 4. In this respect, the reduced diameter section 45 of the exterior surface of the electrical connector 27 is received within a complementary interior recess formed at the right end of the collector 23*b*, and a strong bond is created as by brazing with a vanadium-niobium braze or possibly by electron beam welding the connector 27 to the collector 23*b*.

FIG. 5 depicts the left end segment 15*a* of the envelope having been fitted coaxially about the left end of the completed interior support tube subassembly so that the right edge 43 of the connector (the bottom edge in FIGS. 7 and 8) fits over and circumscribes a very short section, e.g. about 1 mm, of the left edge of the emitter 21*b* of the next cell in series. Connection is then made between the connector 27 and the emitter 21*b* by electron beam welding or the like at the location marked W in FIG. 5. The annular exterior relief 47 at the edge 43 of the connector 27 provides clearance so that there will be no contact between it and the collector 23*b* of the next segment 15*b* to be installed. An annular ceramic spacer (not shown) would be installed in the region generally inward of the annular flange 37 so that it would fill the space between the ceramic body 33 on the interior surface of the envelope segment 15*a* and the emitter 21*a*, maintaining them in coaxial alignment and electrically insulating the emitter from the containment envelope.

As best seen in FIG. 6, an envelope segment 15*b* is then fitted over the interior subassembly from the right end thereof to take the position shown. Mating of the envelope segments 15*a* and 15*b* is facilitated by the outer annular reliefs 57 cut in the outer surface of the refractory metal tube 35 of the segment 15*a* and the tube 39 of each of the segments 15*b* at the right end thereof. As earlier mentioned, a complementary relief is cut in the interior surface at the left end of each refractory metal tube 39 so that the adjacent ends fit together in sliding contact when they are mated, in which location the left end of the segment 15*b* surrounds the electrical connector 27 that was originally a part of the previously installed segment. The presence of the ceramic body 33 on the interior surface of the segment 15*b* assures there is no electrical contact between the connector 27 and the refractory metal tube 39. The mating is then completed by electron beam welding the tubes 35 and 39 to create a secure circular joint at the location marked W in FIG. 6, and the right end of the connector 27 is similarly joined by brazing or electron beam welding to the emitter 21*b* of the next cell in series, about a 1 mm length of which it may circumscribe, as previously described. This procedure is repeated seven more times so that eight such envelope segments 15*b* are installed for a thermionic converter having ten cells in series.

The final segment 15*c* of the envelope is a tube 59 of refractory metal that is thicker in wall section and serves as the integral collector 23*a*; it would have an interior diameter equal to the interior diameter of the tubular collectors 23*b* that form a part of each of the segments 15*b*. The left end of the final segment 15*c* is machined to create a similar interior annular recess that slidably receives the reduced diameter portion 57 at the right end of the last segment 15*b* in line, following which electron beam welding is carried out at that joint to complete the 10-segment containment envelope, as seen in FIG. 1. The right end of the thermionic converter is appropriately closed and sealed (not shown) so that a high vacuum is maintained within the region between the outer envelope and the interior tubular support, i.e. between about 50 and 1300 Pa, and provision may be made for providing a minute amount of cesium vapor, as well known in this art. The slotted connectors 27 provide a path by which cesium vapor can travel from one end to the other of the interior of the thermionic converter 11.

Because the illustrated connectors are basically short segments of metal tubing, they are relatively easy to machine with accuracy, and the slotted design has a relatively low, peak residual strain and a particularly favorable resistance to fatigue so that it is considered to have a long fatigue life. In addition, the use of connectors 27 that are essentially sections of straight metal tubing further facilitates assembly of the thermionic converter 11; however, many of the advantages of this construction would also be obtained in tubular connectors of noncircular or frustoconical cross-sectional configuration.

Figure 10:
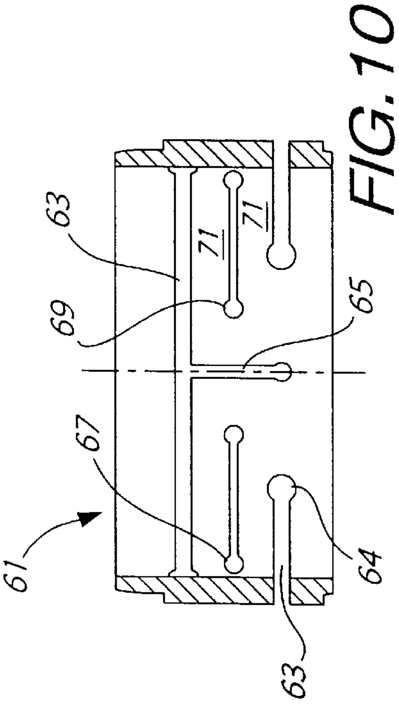
FIGS. 9 and 10 are front and side sectional views similar to FIGS. 7 and 8 of an alternative embodiment of a tubular connector that may be employed in the thermionic converter of FIG. 1.
Figure 9:
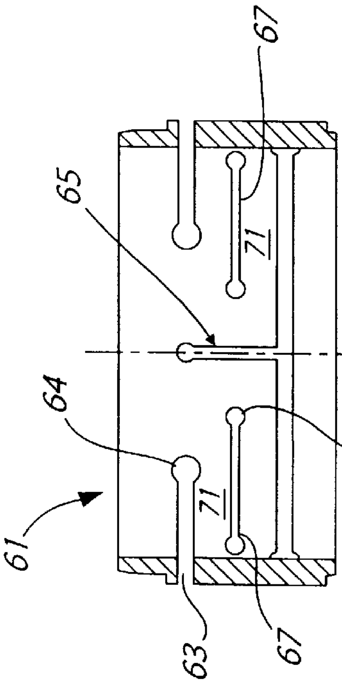

Shown in FIGS. 9 and 10 is an alternative embodiment of an electrical connector 61 that is considered to exhibit even greater flexibility and lower stress concentration and therefore to have an even longer fatigue life than the electrical connectors 27 described hereinbefore. These connectors 61 are essentially the same as the connectors 27 in dimensions and shape, and some of the common features are not described. They include a pair of slots 63 each about 110° in arc length, in two primary planes which terminate in circular holes 64, but in addition, they include a more complex aperture pattern.

These connectors 61 include four axially extending keyhole apertures 65 which are located at the midpoints of each of the four slots 63 and which extend toward the farther edge. These keyhole apertures are aligned perpendicular to the primary planes and extend from one primary plane to the next. The width of the straight slit section of each keyhole aperture 65 is between about 25% and about 50% of the width of the slots 63 in the primary planes, and these slits similarly terminate in a radially extending, circular hole at the end of the keyhole that has a diameter between about 150% and about 180% of the width of the straight section. The addition of these four keyhole apertures 65, symmetrically positioned at the four midpoints and extending between the two primary planes, has been found to increase flexibility and decrease stress concentration within the electrical connectors without significantly increasing the electrical resistance of the connector 61 compared to that of the connectors 27. In the latter respect, the inclusion of the keyhole apertures 65 in the relatively wide regions of the electrical connector 61 between the respective ends of the pairs of slots 63 in each primary plane does not significantly lengthen or narrow the current path which naturally divided into two paths at this location as earlier described. Because there is no significant concern from an electrical resistance standpoint, the inclusion of these four keyhole apertures 65 is a preferred alternative embodiment which can be included in the connector 27 without the additional change described hereinafter.

Auxiliary slits 67 that are arranged to have minimal effect on the current path are provided in a third plane that is positioned between the two primary planes and parallel thereto, i.e. oriented perpendicular to the axis of the tubular connector 61. The plane is preferably spaced equidistantly between the two primary planes; however, in certain instances to compensate for temperature-dependent material properties,there may be some advantage in locating it slightly closer to one of the edges 41, 43. In the illustrated embodiment, four slits 67 are provided, and these auxiliary slits 67 should each be between about 45 and about 55° of arc length. They preferably have the same widths as just mentioned for the slit portions of the keyhole apertures 65, and they likewise terminate in circular holes 69 having a diameter between about 150% and about 180% of the width of the slits 67. The slits 67 are located so as to minimize the increase in electrical resistance that they will cause, and in this respect, they are preferably positioned with each end located about midway circumferentially between the keyhole aperture 65 and the end of the adjacent primary slot 63.

If desired, all of the holes, the holes 64, those at the end of the keyhole apertures 65, and the holes 69 may be oriented precisely radially. However, the holes 69 at the end of each of the auxiliary slits 67 may alternatively be oriented parallel to each other and in alignment with those holes diametrically opposed, if desired, for manufacturing efficiency. The presence of such auxiliary slits 67, located in a plane between from the two primary planes, has been shown to still further increase flexibility of the electrical connectors 61 and to also further reduce stress concentrations and thus add to fatigue lifetime. There is some small increase in electrical resistance because the ligament region is changed from one relatively wide path to two narrower paths 71 which are each slightly lengthened. However, the current flow path in this region was already essentially parallel to the slits 67 so the change is not substantial; as a result, the advantages which grow from such an increase in flexibility are felt to adequately offset such increase in electrical resistance. Thus, the inclusion of the slits 67 is felt to provide a still further valuable improvement when flexibility and fatigue lifetime are important considerations.

Figure 11:
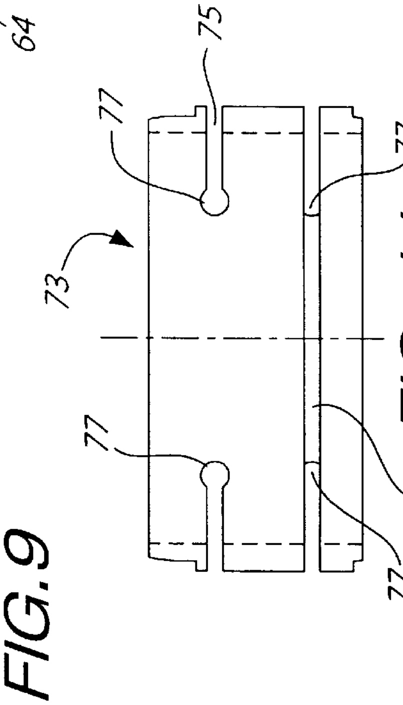
FIG. 11 is a front view of another alternative embodiment of a connector.

Shown in FIG. 11 is a front view of another alternative embodiment of a connector embodying various features of the invention. Illustrated is a connector 73 which has essentially the same size and shape as the connectors 27 and 61 and differs only in the aperture pattern. The connector 73 includes only a single slot 75 in each of the two primary planes which extends for a length of about 270° of arc. Each slot terminates in a pair of holes 77 which, like all of the slots, extend completely through the sidewall of the tubular segment. As can be seen, the two slots 75 are oriented opposite to each other so as to provide a symmetrical aperture pattern. The dimensions of the slots and holes may be the same as those described with regard to the connector 27. The connector 73 has excellent flexibility and a long fatigue lifetime; however, the current path is slightly longer and thus the electrical resistance slightly higher.

Figure 13:
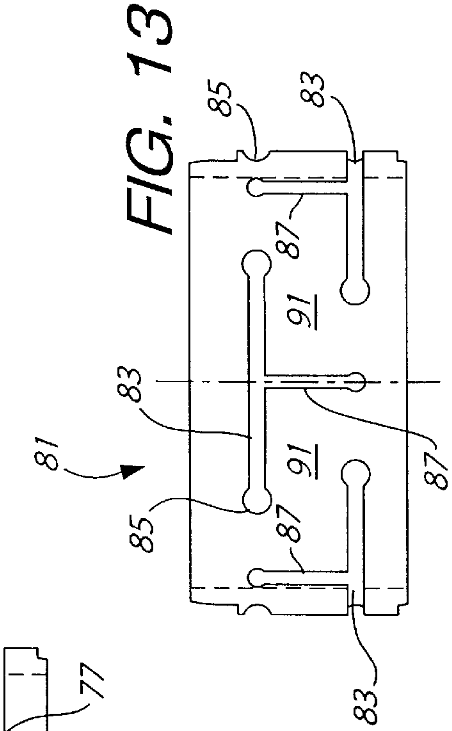
FIGS. 12 and 13 are front and rear views similar to FIG. 11 of yet another alternative embodiment of a tubular connector that may be employed in the thermionic converter of FIG. 1.
Figure 12:
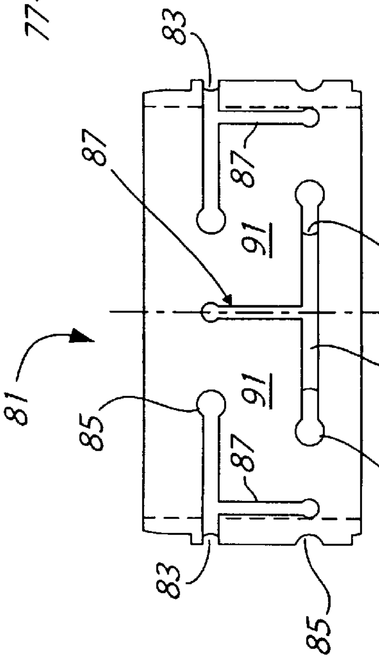

Illustrated in FIGS. 12 and 13 is yet another alternative embodiment of an electrical connector which might be employed. Illustrated is a connector 81 in front and rear plan views which includes three slots 83 in each of the primary planes, each of which terminate in a hole 85 of greater diameter. Each of the slots 83 extends for about 70° of arc length, and the slots in each plane are equidistantly spaced from one another by about 50° of arc length. The dimensions of the slots and the holes may be the same as those described for the connector 27. A keyhole aperture 87 similar to the keyhole aperture 65 is located at the midpoint of each of the slots 83. The connectors 81 have very good flexibility, and the six current paths from the upper to the lower edge of the connectors through the regions 91 located generally between the pairs of holes 85 adjacent one another in the two primary parallel planes provide relatively low electrical resistance. Thus, although the connectors 81 require some additional machining, they have particular advantages.

Although the invention has been described and illustrated with respect to the best modes presently known to the inventors, it should be understood that various changes and modifications, as would be obvious one ordinarily skilled in this art, may be made without departing from the scope of the invention which is defined in the claims that are appended hereto. For example, as previously indicated, these connectors are considered to be equally useful in a thermionic converter wherein tubular emitters carried by and heated through the exterior containment vessel are disposed in surrounding relationship to tubular collectors. Although a description is given of ten thermionic cells connected in series, the connectors can likewise be employed to interconnect other numbers of cells as desired to achieve a particular voltage, for example three cells or five cells.

Particular features of the invention are emphasized in the claims that follow.

What is claimed is:

1. A multiple cell thermionic converter for use in a vacuum environment comprising:

a plurality of tubular electron emitters attached to a first support member, a plurality of tubular electron collectors attached to a second support member, said emitters and said collectors being disposed coaxially and juxtaposed with one another with uniform gaps therebetween to provide a plurality of thermionic cells, and tubular metal connectors which have a pair of edges and which interconnect, in series electrical connection, the collector of one such thermionic cell to the emitter of the next-adjacent cell by joinder to said respective edges, said connectors being apertured in a pattern that effectively reduces stress inherently created therein from thermal expansion and contraction of said converter resulting from changes between ambient temperature and operating temperature while still providing a low resistance current path, said aperture pattern including a set of slot means disposed in at least two primary planes that are oriented substantially perpendicular to the axis of the tubular connector.

2. The multiple cell thermionic converter according to claim 1 wherein each said slot means contains one or more slots which extend for a total of at least about 180° of arc and which are arranged so that said aperture pattern is symmetrical.

3. The multiple cell thermionic converter according to claim 1 wherein each said slot means terminates in a pair of circular openings having a diameter greater than the width of said slot means.

4. The multiple cell thermionic converter according to claim 1 wherein each of said slot means in each said primary plane includes at least two slots of substantially equal length, and wherein said planes are spaced apart so that each is respectively nearer to one said edge of said connector than to said other primary plane.

5. The multiple cell thermionic converter according to claim 4 wherein the total length of said slots in each primary plane is at least about 180° of arc and wherein each slot terminates in a circular opening of greater diameter than the width of the slot.

6. The multiple cell thermionic converter according to claim 4 wherein said aperture pattern also includes short keyhole openings at about the midpoint of each said slot in each primary plane.

7. The multiple cell thermionic converter according to claim 4 wherein said aperture pattern also includes auxiliary slits disposed in a plane between said primary planes.

8. The multiple cell thermionic converter according to claim 7 wherein said plane of said auxiliary slits is equidistant from said primary planes.

9. The multiple cell thermionic converter according to claim 1 wherein each said slot means has a width between about 2% and about 20% of the axial length of said tubular connector.

10. The multiple cell thermionic converter according to claim 9 wherein said tubular connector is circular in cross-section and has a thickness equal to between about 2% and about 12% of the outer diameter of said connector.

11. The multiple cell thermionic converter according to claim 10 wherein said tubular connectors are made of a refractory metal selected from the group consisting of tantalum, tungsten, rhenium, niobium, molybdenum and alloys thereof.

12. The multiple cell thermionic converter according to claim 1 wherein said connector is a thin metallic tube of substantially constant interior diameter and wherein each end of said connector has an annular recess in its exterior surface.

13. The multiple cell thermionic converter according to claim 1 wherein said emitters and said collectors are respectively supported on tubular ceramic bodies carried by the respective surfaces of said first and second support members.

14. The multiple cell thermionic converter according to claim 13 wherein either said first support tube or said second support tube is an integral tube to which a continuous coating is fused to provide said ceramic body upon which either said emitters or said collectors are supported.

15. A multiple cell thermionic converter for use in a vacuum environment comprising:

a plurality of tubular electron emitters of circular cross-section attached to a first support member of circular cross-section but separated therefrom by an electrically insulating ceramic layer, a plurality of tubular electron collectors of circular cross-section attached to a second support member of circular cross-section but separated therefrom by an electrically insulating ceramic layer, said emitters and said collectors being disposed coaxially and juxtaposed with one another with uniform annular gaps therebetween to provide a plurality of thermionic cells, and tubular metal connectors of circular cross-section which have a pair of edges and major interior and exterior surfaces of essentially constant diameter, said connectors interconnecting, in series electrical connection, the collector of one such thermionic cell to the emitter of the next-adjacent cell by joinder to said respective edges, said connectors being apertured in a pattern that effectively reduces stress inherently created therein from thermal expansion and contraction of said converter of said converter resulting from changes between ambient temperature and operating temperature while still providing a low resistance current path, said aperture pattern including a set of slot means disposed in at least two primary planes that are oriented substantially perpendicular to the axis of the tubular connector, each of said slot means containing one or more slots which extend for a total of at least about 180° of arc, which are arranged so that said aperture pattern is symmetrical and which each terminate in a pair of circular openings having a diameter greater than the width of said slot.

16. The multiple cell thermionic converter according to claim 15 wherein each of said slot means in each said primary plane includes at least two slots of substantially equal length, and wherein planes are spaced apart so that each is respectively nearer to one said edge of said connector than to said other primary plane.

17. The multiple cell thermionic converter according to claim 16 wherein said aperture pattern also includes short keyhole openings at about the midpoint of each said slot in each primary plane.

18. The multiple cell thermionic converter according to claim 17 wherein said aperture pattern also includes auxiliary slits disposed in a plane between said primary planes.

19. The multiple cell thermionic converter according to claim 15 wherein each said slot means has a width between about 2% and about 20% of the axial length of said tubular connector, wherein said tubular connector has a thickness equal to between about 1% and about 20% of the outer diameter of said connector and wherein said tubular connectors are made of a refractory metal selected from the group consisting of tantalum, tungsten, rhenium, niobium, molybdenum and alloys thereof.

* * * * *